(12) United States Patent
Nishino (10) Patent No.: US 7,913,796 B2
(45) Date of Patent: Mar. 29, 2011

(54) EXHAUST SYSTEM FOR MOTORCYCLE AND MOTORCYCLE

(75) Inventor: Norihide Nishino, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 432 days.

(21) Appl. No.: 12/028,221

(22) Filed: Feb. 8, 2008

(65) Prior Publication Data

US 2008/0190685 A1 Aug. 14, 2008

(30) Foreign Application Priority Data

Feb. 8, 2007 (JP) ................. 2007-029726

(51) Int. Cl.
*B60K 13/04* (2006.01)
*F01N 13/08* (2010.01)

(52) U.S. Cl. .......................... 180/309; 60/324

(58) Field of Classification Search .................. 180/309, 180/296; 60/272, 273, 323, 324
See application file for complete search history.

(56) References Cited

U.S. PATENT DOCUMENTS

| | | | | |
|---|---|---|---|---|
| 5,152,138 A | * | 10/1992 | Tanabe et al. | 60/313 |
| 6,374,600 B2 | * | 4/2002 | Uegane et al. | 60/322 |
| 7,610,748 B2 | * | 11/2009 | Kono et al. | 60/276 |
| 7,637,349 B2 | * | 12/2009 | Harada | 181/265 |
| 7,686,122 B2 | * | 3/2010 | Nakayama | 180/296 |
| 2004/0007037 A1 | * | 1/2004 | Yoshino et al. | 72/369 |

FOREIGN PATENT DOCUMENTS

| | | | | |
|---|---|---|---|---|
| JP | 58178820 | A | * | 10/1983 |
| JP | 58224812 | A | * | 12/1983 |
| JP | 60036710 | A | * | 2/1985 |
| JP | 60095119 | A | * | 5/1985 |
| JP | 62-030283 | | | 7/1987 |

\* cited by examiner

*Primary Examiner* — J. Allen Shriver, II
*Assistant Examiner* — John R Olszewski
(74) *Attorney, Agent, or Firm* — Rabin & Berdo, PC (57) ABSTRACT

An exhaust system for a motorcycle in which a bank angle is secured while a necessary passage area of exhaust gas is maintained. A connection pipe connecting left and right exhaust pipes is disposed in an area enclosed by a bottom surface of an engine and left and right bank angle lines in a front view.

11 Claims, 9 Drawing Sheets

EXHAUST SYSTEM FOR MOTORCYCLE AND MOTORCYCLE

RELATED APPLICATIONS

This application claims the benefit of priority under 35 USC 119 of Japanese patent application no. 2007-029726, filed on Feb. 8, 2007, which application is hereby incorporated by reference in its entirety.

BACKGROUND OF THE INVENTION

1. Field of the Invention

The present invention relates to an exhaust system for a motorcycle including left and right exhaust pipes connected by a connection pipe.

2. Description of Related Art

An exhaust system of a motorcycle may have left and right exhaust pipes connected to exhaust ports of left and right cylinders that extend rearward and pass lower sections of left and right sides of the engine. In one such exhaust system, a connection pipe extending in a width direction below the engine connects the exhaust pipes in order to effectively use exhaust pulsation (see JP-B-Sho 62-30283, for example).

This system has a problem in that a sufficient bank angle cannot be secured because the connection pipe easily contacts the ground. Consideration has been given to reducing the diameter of the connection pipe to secure the bank angle. However, this causes a problem in that a desired engine output characteristic is not achieved because the passage area of exhaust gas is reduced.

SUMMARY OF THE INVENTION

The present invention addresses these drawbacks and provides an exhaust system for a motorcycle in which a bank angle is secured while a necessary passage area of exhaust gas is maintained.

One embodiment of the present invention is an exhaust system of a motorcycle including left and right exhaust pipes extending rearward below left and right sides of an engine. A connection pipe connects the exhaust pipes and is disposed in an area enclosed by left and right bank angle lines connecting a first ground contact point of the motorcycle and a ground contact point of a tire when the motorcycle is leaned to the right or left, and a bottom surface of the engine. Parts in vicinities of the connections of the connection pipe to the exhaust pipes contact the bank angle lines.

In the exhaust system according to the present invention, because the connection pipe is positioned in the area enclosed by the bank angle lines and the bottom surface of the engine, the problem of reducing the bank angle to avoid contact of the connection pipe with the ground is avoided.

Further, since parts in vicinities of the connections of the connection pipe to the exhaust pipes contact the bank angle lines, cross-sectional areas in the vicinities of the connection sections are secured. Specifically, the bottom surface of the engine is positioned on a side of the connection sections opposite to the bank angle lines. Therefore, a maximum cross-sectional area is secured because external surfaces of the connection sections on sides of the bank angle lines contact the bank angle lines. Consequently, exhaust gas emission performance is enhanced by effectively utilizing exhaust pulsation, and engine output characteristics are enhanced while turning performance is maintained.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the present invention is now described with reference to the drawings.

FIGS. 1-9 illustrate an exhaust system for a motorcycle according to one embodiment of the present invention. Directions such as front, rear, left, and right in the following description are directions from a perspective of a person sitting on the seat. Moreover, directions such as "width direction" refer to the width direction of motorcycle 1.

In the drawings, reference numeral 1 denotes a motorcycle. Motorcycle 1 has a body frame 2 of a twin spar type, an engine 3 mounted on body frame 2, and a front wheel 4 and a rear wheel 5 disposed at the front and rear of body frame 2.

A head pipe 6 is positioned at a front end of body frame 2. Left and right main frames 2a extend downward and obliquely rearward and expand to the left and right from head pipe 6. Left and right rear frames 2b curvedly extend downward in a continuation of main frame 2a. Left and right seat frames 2c extend upward and obliquely rearward from rear frames 2b.

A front fork 7 is swingably supported by head pipe 6 in a manner operable to the left and right. Front wheel 4 is rotatably supported with its shaft at a lower end of front fork 7, and a steering handlebar 8 is fixed on an upper end of front fork 7.

A front end of a rear arm 9 is supported at lower ends of rear frames 2b via a pivot shaft 10 in a manner swingable in the vertical direction, and rear wheel 5 is rotatably supported with its shaft at a rear end of rear arm 9.

A straddle type main seat 11 and a tandem seat 12 disposed behind main seat 11 are mounted on seat frames 2c. An exterior tank cover 13 is disposed on a front side of main seat 11.

Engine 3 is a four-cycle V-type four-cylinder engine having left and right front cylinders and left and right rear cylinders disposed in a shape of a V-bank. Engine 3 is suspendedly supported by left and right suspension brackets 15 fixed on left and right main frames 2a.

A crankcase 20 housing a crankshaft 19 is joined to a lower joint surface of front and rear cylinder blocks 17 and 18 forming the V-bank. Front and rear cylinder heads 21 and 22 are joined to an upper joint surface of cylinder blocks 17 and 18. Front and rear head covers 23 and 24 are attached to cylinder heads 21 and 22.

A transmission case 20a housing a transmission mechanism is continuously formed as one unit with a rear side of the crankcase 20. Upper and bottom walls of transmission case 20a are fixed on rear frame 2b by a fastening bolt. An output shaft 25 outputs engine power.

An oil pan 16 expanding downward is fixed by a fastening bolt on a lower joint surface of crankcase 20. The height of a lower surface of oil pan 16 is the minimum road clearance of motorcycle 1. A drain bolt 16b is attached detachably to a left wall 16a of oil pan 16.

An intake system 29 of engine 3 is provided with front and rear intake pipes 26 and 27 at the left and right communicated to front and rear intake ports on an inner wall of cylinder heads 21 and 22, a throttle body connected to front and rear intake pipes 26 and 27 at the left and right sides, and a common air cleaner connected to each throttle body.

The air cleaner is disposed below tank cover 13 between left and right main frames 2a. Intake pipes 26 and 27 extend generally in a vertical direction from the inner wall of the V-bank. Left and right air intake ducts 14 for supplying air to engine 3 are disposed on left and right sides of tank cover 13 and are connected to the air cleaner.

An exhaust system 30 of engine 3 has four exhaust pipes 31 connected to engine 3, one exhaust chamber 32 connected to each exhaust pipe 31, and a pair of mufflers 33 at the left and right connected to exhaust chamber 32.

Exhaust chamber 32 is disposed between transmission case 20a of engine 3 and rear wheel 5, and below rear arm 9 including pivot shaft 10. A front flange 32a projecting from a front end of exhaust chamber 32 is attached to crankcase 20. Left and right flanges 32b formed to stand on left and right edges of an upper wall are attached to rear frame 2b via a bracket.

An oxygen concentration detection sensor 42 is inserted and attached in an end on an inner side in the width direction of the upper wall of exhaust chamber 32. Oxygen concentration detection sensor 42 is enclosed by exhaust chamber 32, left and right rear frames 2b, pivot shaft 10, and rear arm 9. Thus, damage caused by external force is suppressed.

Figure 3:
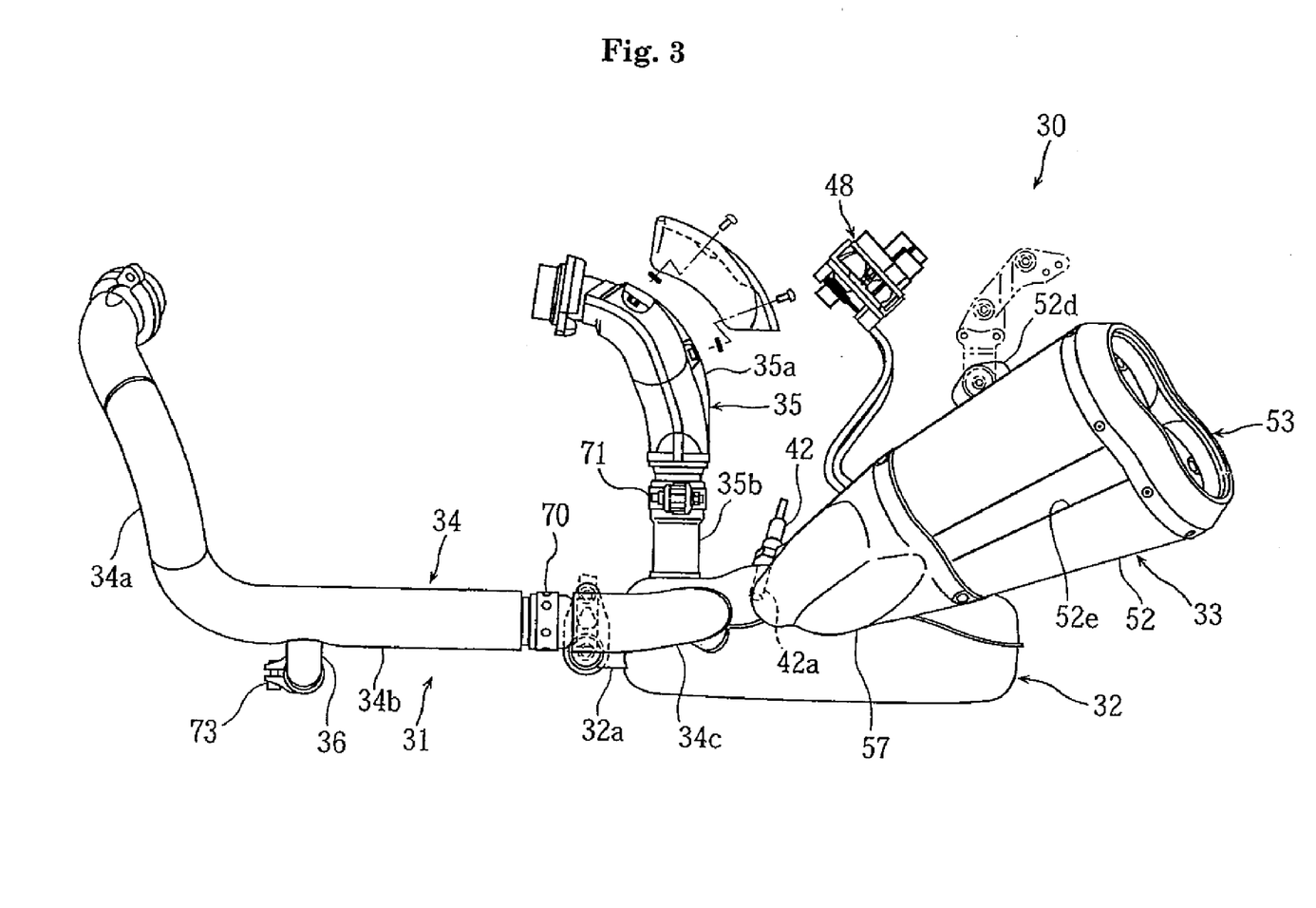
FIG. 3 is a side perspective view of the exhaust system.
Figure 4:
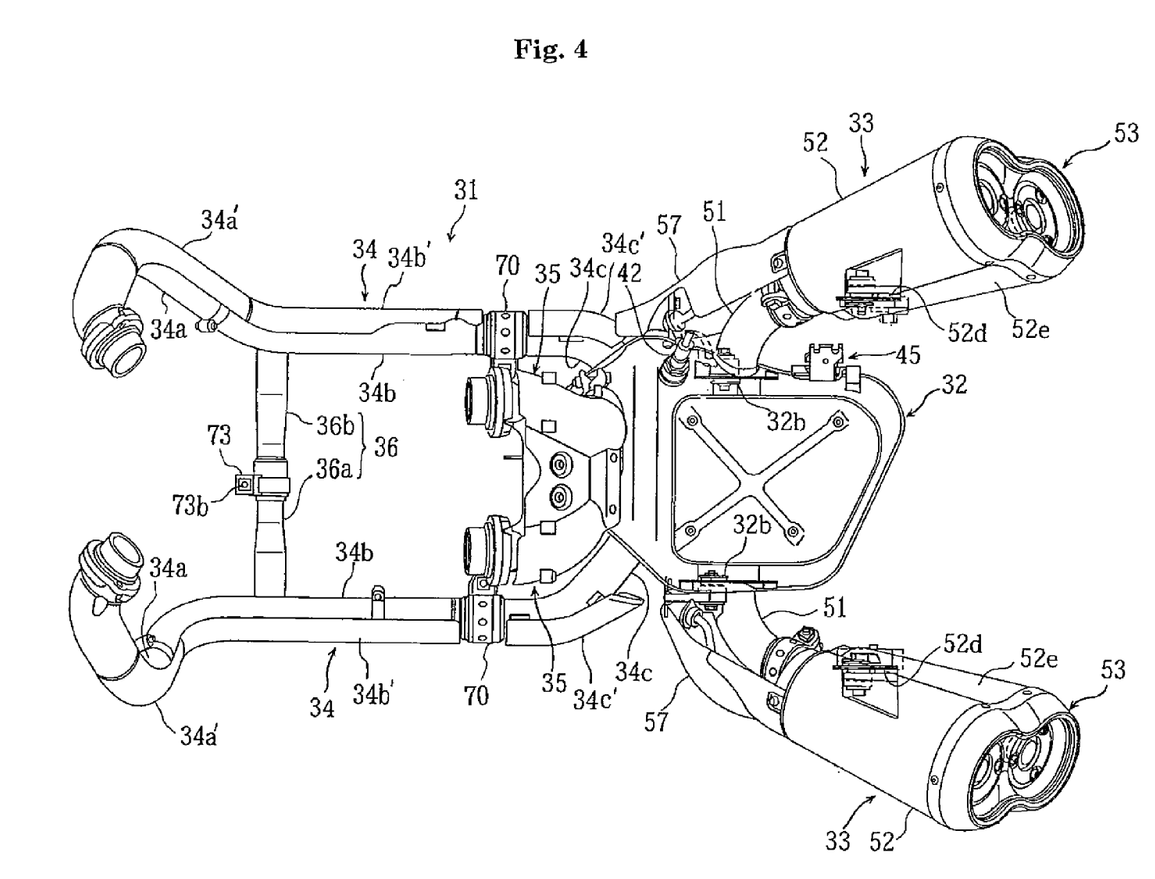
FIG. 4 is a plan perspective view of the exhaust system.

A passage area variable valve 45 that adjusts the passage area of an exhaust passage is disposed on a downstream side of oxygen concentration detection sensor 42 (FIG. 4). Valve 45 is opened or closed according to engine rotational speed, engine load and the like. Specifically, valve 45 is closed when the engine is in a low-speed range and opened when the engine is in a middle- or high-speed range. A drive motor 48 actuated for opening or closing valve 45 is disposed in a side cover 50 below seat frame 2c (FIGS. 2 and 3).

Each muffler 33 has a tail pipe 51 connected to exhaust chamber 32, a casing 52 enclosing tail pipe 51, and a tail cap 53 covering a rear end wall of casing 52.

Figure 1:
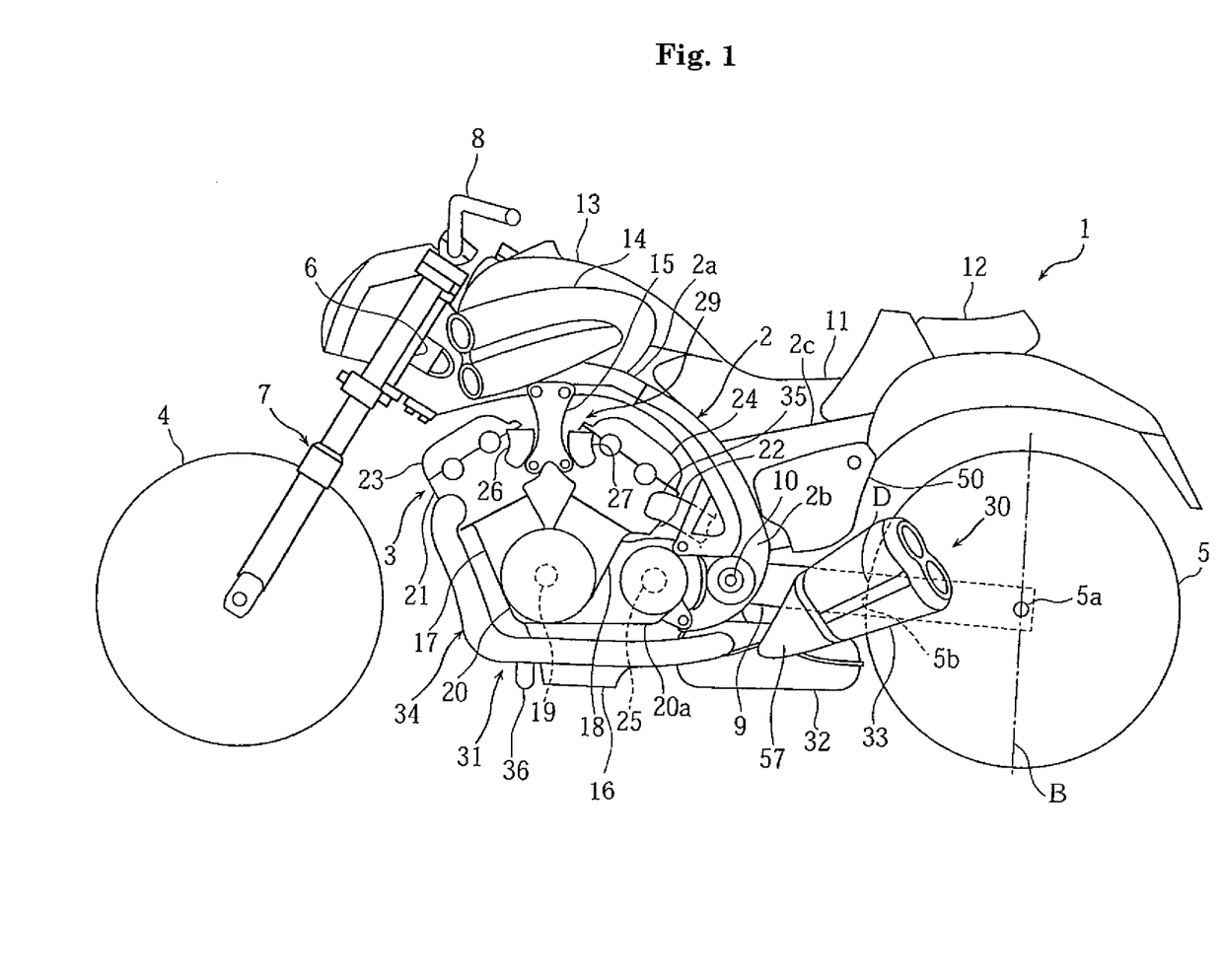
FIG. 1 is a side view of a motor vehicle having an exhaust system according to one embodiment of the present invention.
Figure 2:
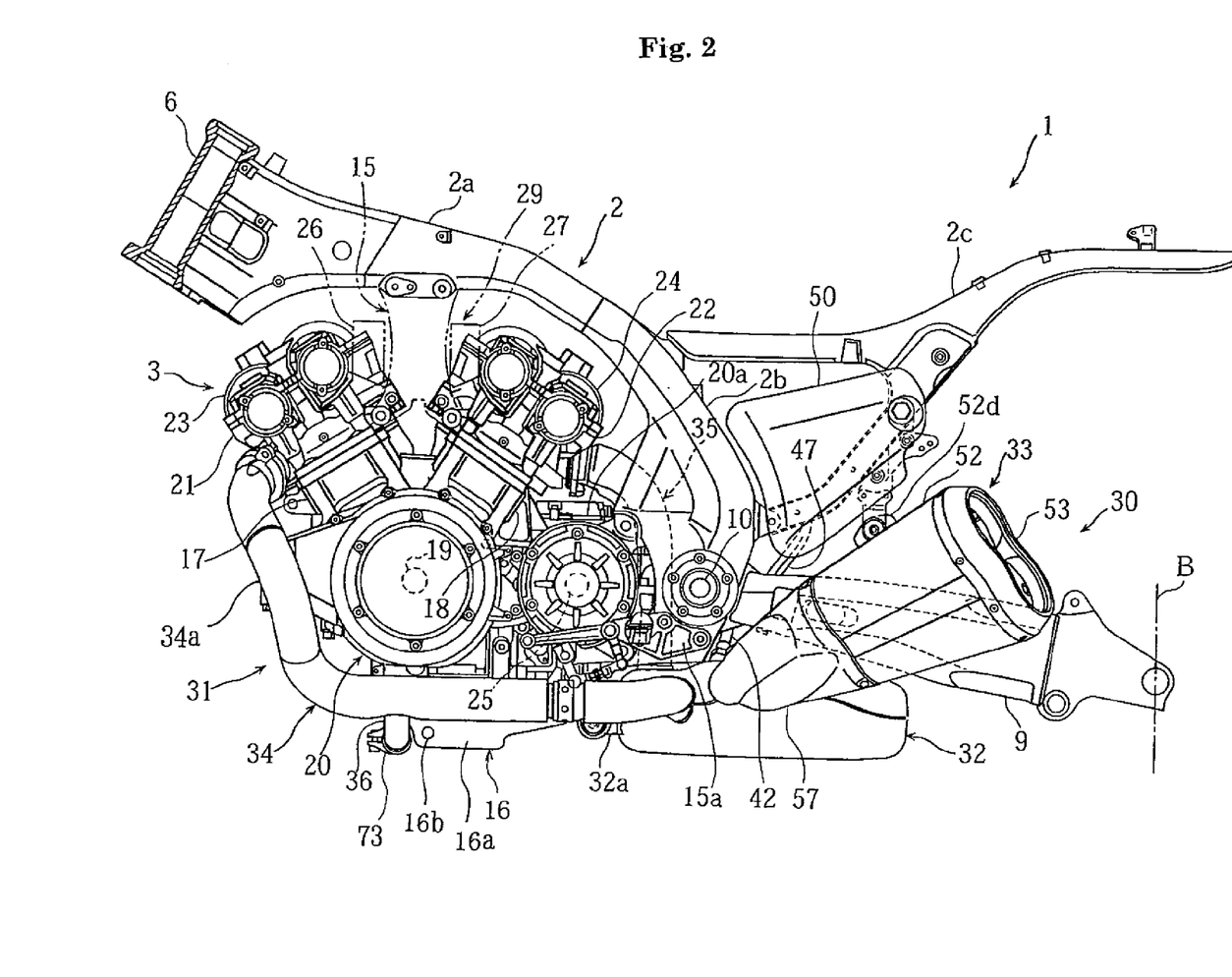
FIG. 2 is a side view of a body frame in which the exhaust system is disposed.

Mufflers 33 are disposed in front of vertical line B passing through the center of rotational shaft 5a of rear wheel 5 (FIGS. 1 and 2). Further, a center D in the longitudinal direction of each muffler 33 is positioned in a vicinity of front edge 5b of rear wheel 5 (FIG. 1). Mufflers 33 extend upward and obliquely rearward from exhaust chamber 32 and project outward in the width direction.

A mount bracket 52d fixed on an upper wall surface of casing 52 is attached to seat frame 2c detachably via a stay member or the like.

Casing 52 has a horizontal cross-section in a shape of an ellipse that increases in area in the flow direction of exhaust gas. That is, the cross-section of casing 52 increases from a front to a rear side. The major axis of the ellipse is directed generally in the vertical direction and inclines upward and obliquely rearward. Recesses 52e extending in the longitudinal direction (in the direction of the flow of exhaust gas) are concavely provided at the center in the vertical direction of casing 52. Consequently, casing 52 is generally in a shape of a gourd formed by overlapping a part of two circles in a horizontal cross-sectional view.

An exterior cover 57 covers an exposed section on an upstream side of tail pipe 51 between casing 52 and exhaust chamber 32. Cover 57 has a tapered shape that narrows from a downstream (higher) to an upstream (lower) side, and constitutes a part of casing 52.

The four exhaust pipes 31 include left and right sideways exhaust pipes 34 and left and right longitudinal exhaust pipes 35. Exhaust pipes 34 are connected to exhaust ports on an external wall of front cylinder head 21, and exhaust pipes 35 are connected to exhaust ports on an external wall or rear cylinder head 22.

Each sideways exhaust pipe 34 has a downward inclined section 34a extending downward and projecting outward in the width direction from front cylinder head 21, a horizontal section 34b extended generally linearly and rearward at left and right sides of a lower section of crankcase 20 from a lower end of inclined section 34a, and a side bulge 34c extending inward in the width direction from a rear end of horizontal section 34b. Side bulge 34c is connected to a front wall of exhaust chamber 32. Heat insulation covers 34a', 34b' and 34c' having a horizontal cross-section generally in a shape of a semicircle are detachably attached to and cover external sides in a width direction of sections 34a, 34b and 34c.

Each longitudinal exhaust pipe 35 has a longitudinal bulge 35a curvedly extending downward on a rear side of transmission case 20a from rear cylinder head 22 and a vertical section 35b extending generally linearly in a lower direction in continuation to longitudinal bulge 35a. Vertical section 35b is connected to an upper wall of exhaust chamber 32, such that exhaust pipes 34 and 35 are joined in exhaust chamber 32.

A connection pipe 36 extending in a width direction connects front sections of horizontal sections 34b of exhaust pipes 34.

Connection pipe 36 is divided into left and right connection pipes 36a and 36b generally at the center in the width direction. Openings 36a' and 36b' (joint sections to exhaust pipes 34) on external sides in the width direction of connection pipes 36a and 36b are joined to horizontal sections 34b by welding.

Horizontal section 34b and side bulge 34c of exhaust pipes 34 are divided. Horizontal sections 34b, downward inclined sections 34a, and connection pipes 36a and 36b are integrally joined. Side bulges 34c are integrally joined to exhaust chamber 32. Longitudinal bulge 35a and vertical section 35b of each exhaust pipe 35 are divided, and each vertical section 35b is integrally joined to exhaust chamber 32.

Horizontal section 34b and side bulge 34c of exhaust pipes 34 are connected detachably by joint members 70. Longitudinal bulge 35a and vertical section 35b of exhaust pipes 35 are connected detachably by joint members 71.

Figure 8:
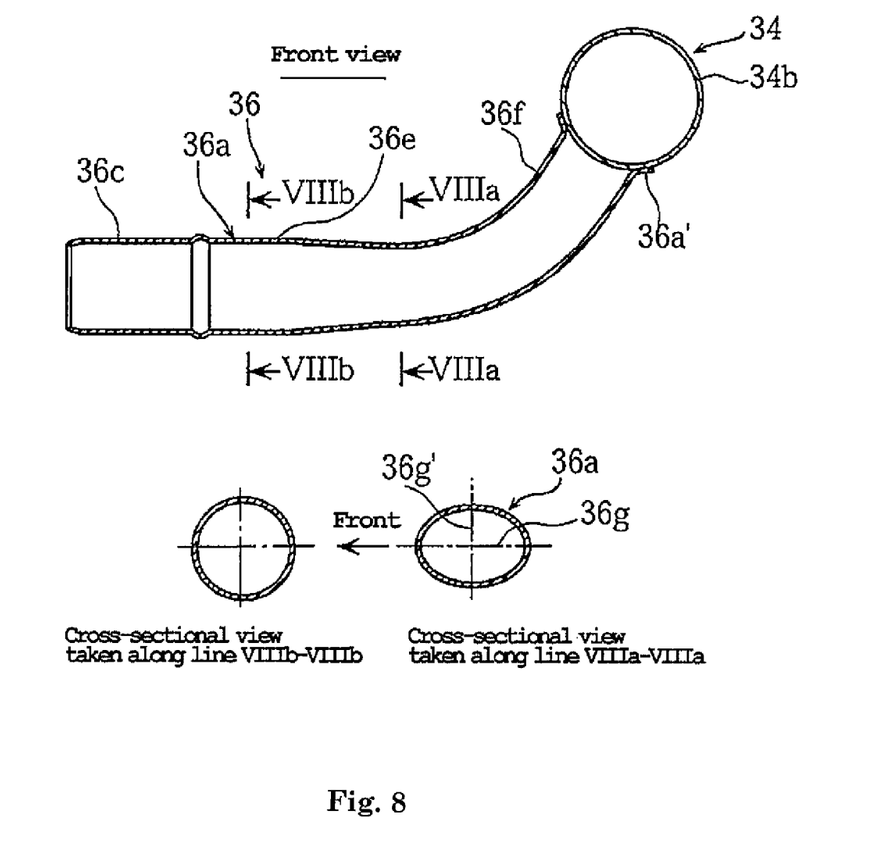
FIG. 8 is a cross-sectional view of the connection pipe.
Figure 9:
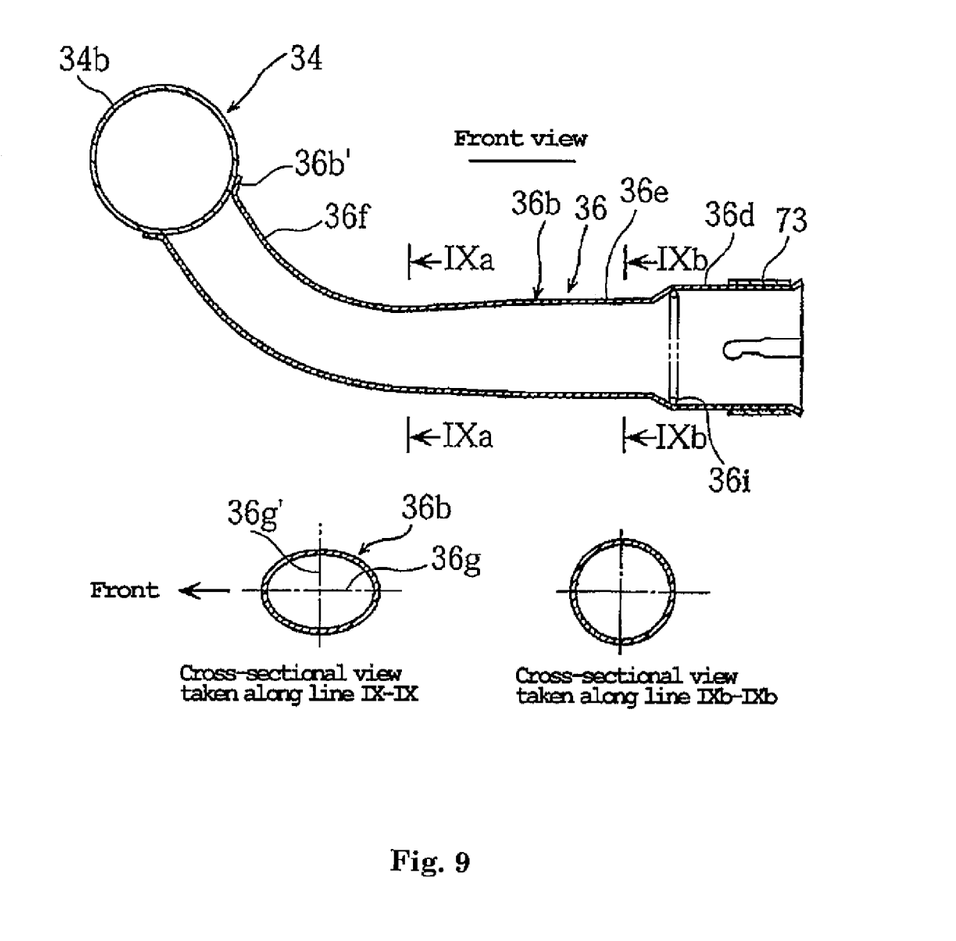
FIG. 9 is a cross-sectional view of the connection pipe.

As shown in FIGS. 8 and 9, a right connection section 36d having an internal diameter is formed at a right end of right connection pipe 36b, and a left connection section 36c is formed at a left end of left connection pipe 36a. Connection sections 36c and 36d have a horizontal cross-section in a shape of a circle and are detachably connected by inserting left connection section 36c into right connection section 36d with a gasket 36i therebetween. In this state, sections 36c and 36d are secured by fastening a joint member 73 with a bolt 73b.

Connection pipes 36a and 36b have left and right linear sections 36e extending outward in the width direction from connection sections 36c and 36d, and left and right inclined sections 36f bending in a shape of an arc and inclining obliquely upward and outward from linear sections 36e to joint sections with exhaust pipes 34. In other words, inclined sections 36f incline obliquely downward and inward from the joint sections with exhaust pipes 34 to linear sections 36e. Left and right linear sections 36e, and left and right inclined sections 36f are formed generally in a bilaterally symmetrical shape.

Connection pipe 36 passes a front side of oil pan 16 constituting a lowermost section of the engine. Specifically, a concave groove 16d is formed in a front wall 16c of oil pan 16 by recessing a lower section of front wall 16c, and a part of connection pipe 36 is positioned in recessed space A (shaded area in FIG. 7) formed by concave groove 16d.

Figure 5:
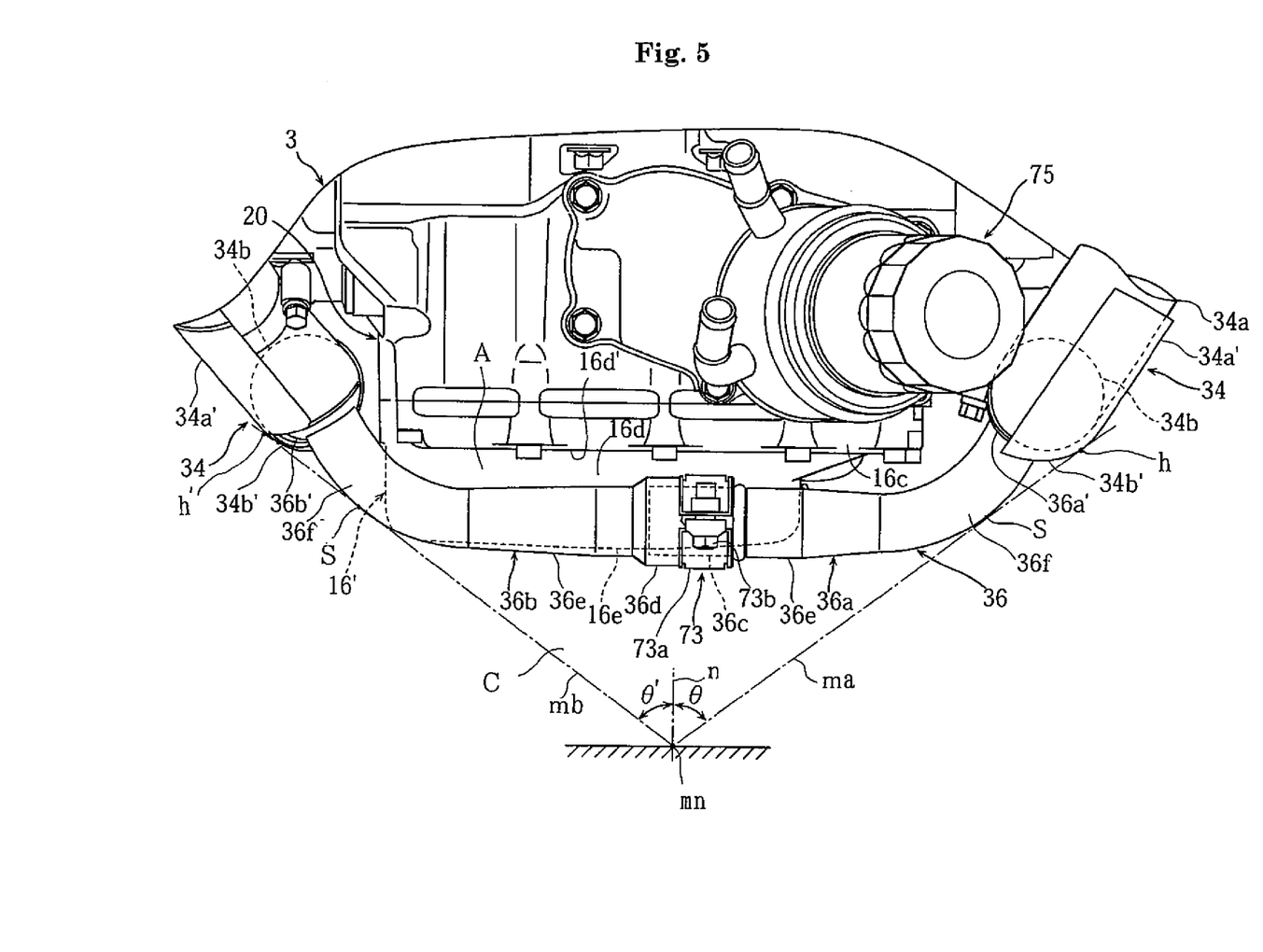
FIG. 5 is a front perspective view of a connection pipe of the exhaust system.
Figure 6:
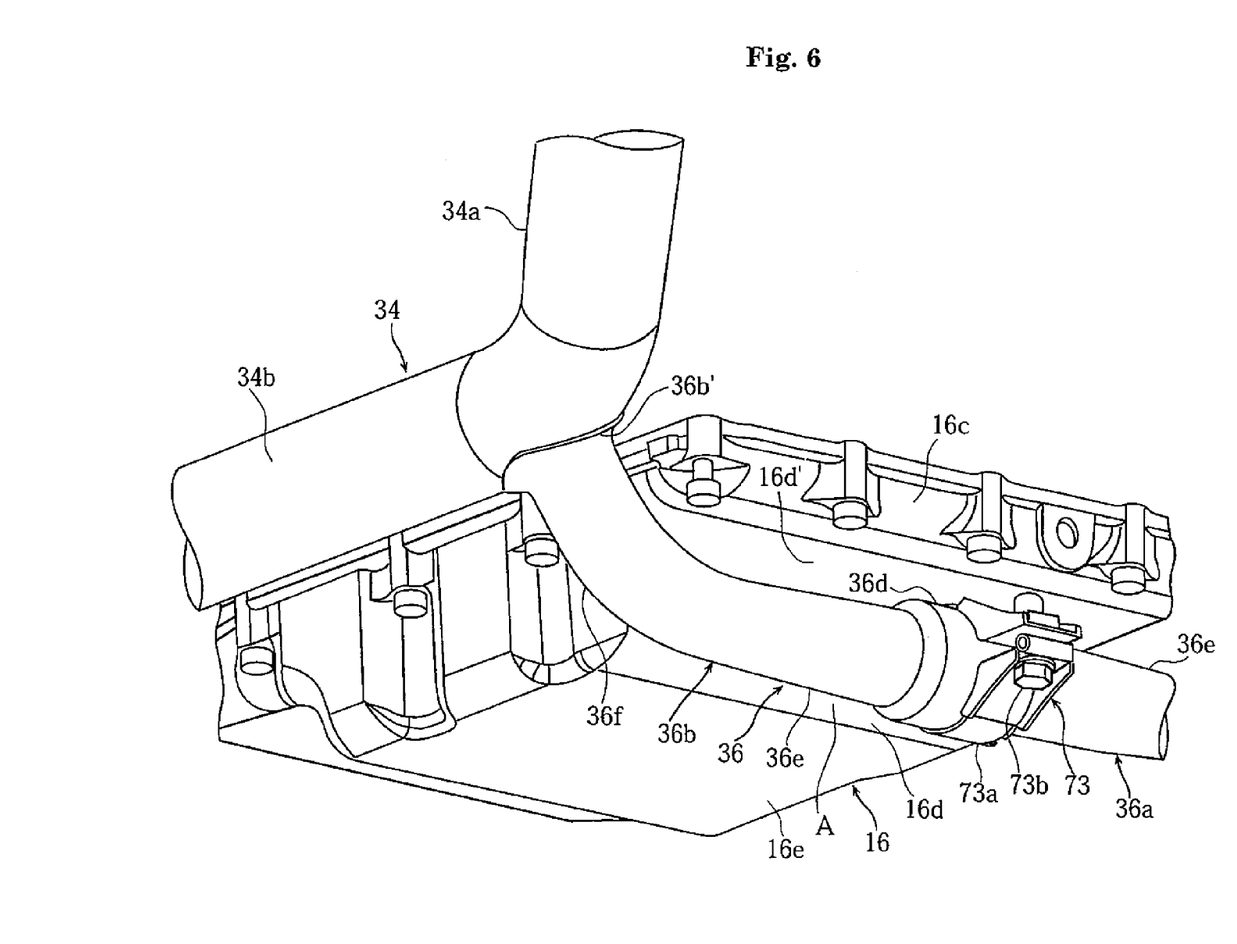
FIG. 6 is a perspective view of the connection pipe.
Figure 7:
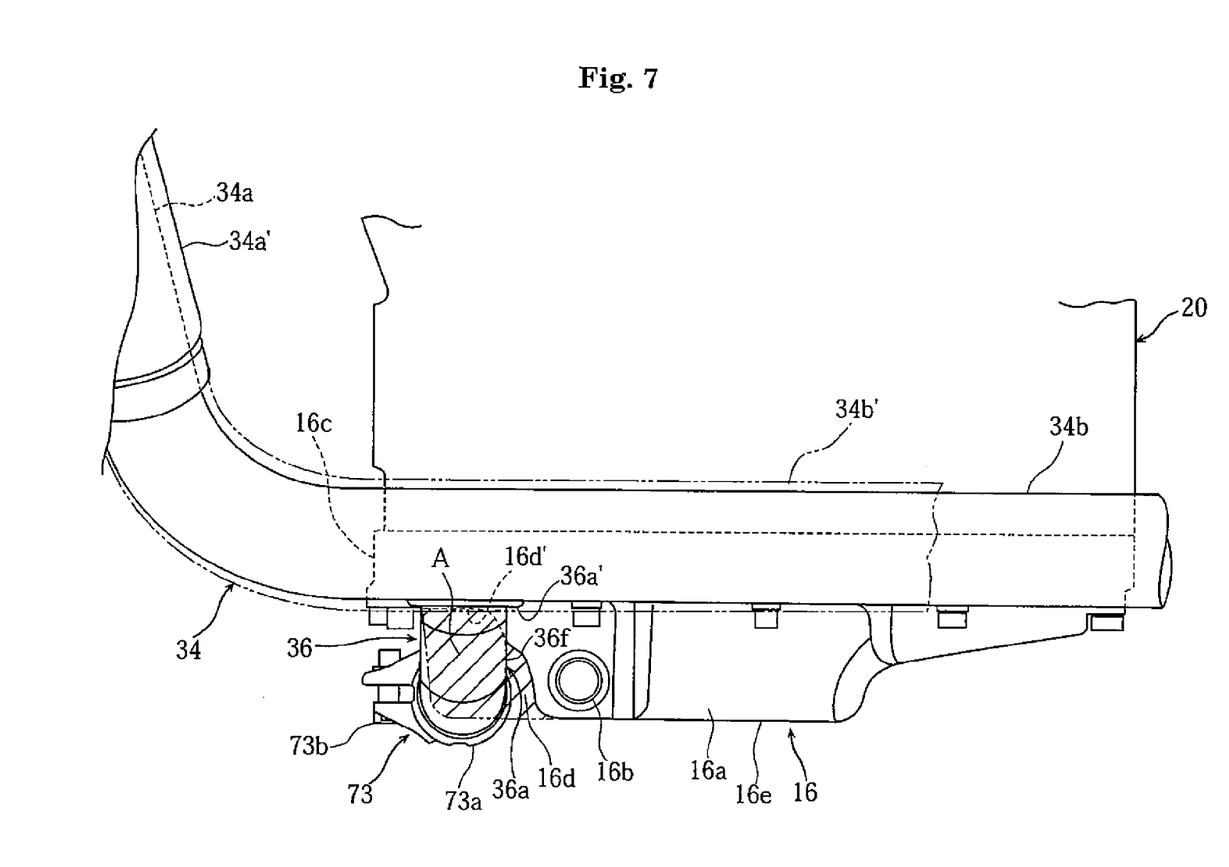
FIG. 7 is a side view of the connection pipe.

A lower surface of connection pipe 36, specifically, a lower surface 73a of joint member 73) is positioned at generally the same height as a lower surface 16e of oil pan 16. Drain bolt 16b is disposed in a corner between left sideways exhaust pipe 34 and left connection pipe 36a, as viewed from a side of motorcycle 1 (FIG. 7). An oil filter 75 is positioned in a part enclosed by left and right exhaust pipes 34 and connection pipe 36 in a front view (FIG. 5). As a result, drain bolt 16b and oil filter 75 can be attached and detached without interference from the exhaust pipes.

As shown in FIG. 5, connection pipe 36 is positioned in an area C enclosed by an engine bottom surface 20a' or, specifically, a top wall 16d' of concave groove 16d of oil pan 16, and a left bank angle line ma and a right bank angle line mb as a bank angle θ in a front view.

Left bank angle line ma, which is a first ground contact point when motorcycle 1 is leaned to the left, is a straight line connecting a ground contact point h of heat insulation cover 34b' and a ground contact point mn of tire 5. Left bank angle θ is formed between left bank angle line ma and vertical line n perpendicular to the ground contact point of the tire.

Right bank angle line mb, which is a first ground contact point when motorcycle 1 is leaned to the right, is a straight line connecting a ground contact point h' of heat insulation cover 34b' and ground contact point mn. Right bank angle θ' is formed by right bank angle line mb and vertical line n.

Linear sections 36e of connection pipes 36a and 36b have a horizontal cross-section in a shape of a circle, while inclined sections 36f have a horizontal cross-section in a shape of an ellipse. A major axis 36g of the ellipse is directed in the longitudinal direction of motorcycle 1 (FIGS. 8 and 9). Connection pipes 36a and 36b are formed by compressively deforming a part corresponding to inclined sections 36f of a pipe with the same diameter with linear section 36e in a radial direction and further by bending to deform the part into a shape of an arc. Inclined sections 36f are formed by pressing or the like so that major axis 36g becomes gradually longer and minor axis 36g' becomes gradually shorter in an outward direction from the linear section to the joint section with the exhaust pipe. External surfaces S in the bending sections of inclined sections 36f are in contact with bank angle lines ma and mb.

According to the embodiment, connection pipe 36 communicating exhaust pipes 34 is positioned in area C enclosed by left and right bank angle lines ma and mb and top surface 16d' of concave groove 16d constituting the bottom surface of the engine. Therefore, bank angle θ is not reduced because of connection pipe 36.

In addition, since inclined sections 36f as parts in a vicinity of the left and right connection sections of connection pipe 36 are generally in contact with bank angle lines ma and mb, the cross-sectional areas of inclined sections 36f are secured. Specifically, top surface 16d' as the bottom surface of the engine is positioned on a side of inclined sections 36f opposite to bank angle lines ma and mb. Therefore, the diameters of inclined sections 36f are increased because external surfaces S of inclined sections 36f on the side of bank angle lines ma and mb are in contact with bank angle lines ma and mb. Consequently, a larger cross-sectional area can be secured. Further, inclined sections 36f have an elliptical horizontal cross-section with major axis 36g thereof directed in the longitudinal direction of the vehicle. As a result, bank angle θ and a passage cross-sectional area are secured.

As described above, the passage cross-sectional area of connection pipe 36 is secured. Therefore, exhaust gas emission performance is enhanced by effectively utilizing exhaust pulsation. As a result, an engine output characteristic is enhanced while turning performance is maintained.

In the embodiment, connection pipe 36 is divided into left and right connection pipes 36a and 36b at the center in the width direction of the vehicle. Connection pipes 36a and 36b are detachably connected by joint member 73 and are joined to left and right exhaust pipes 34 by welding. Therefore, assembly work for exhaust pipes 34 is easily performed.

Connection sections 36c and 36d of connection pipes 36a and 36b have a circular horizontal cross-section. Therefore, the structure of joint member 73 can be simple and connection work is easily performed.

In the embodiment, concave groove 16d is formed in front wall 16c of oil pan 16, and connection pipe 36 is positioned in recessed area A formed by concave groove 16d. Therefore, connection pipe 36 is disposed at a higher position. Consequently, minimum road clearance is increased and the bank angle is easily secured.

In other words, connection pipe 36 can be disposed on a downstream side in a direction of the flow of exhaust gas as much as an amount provided by concave groove 16d. In other words, connection pipe 36 is more freely positioned in relation to the direction of the flow of exhaust gas.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. An exhaust system of a motorcycle, comprising:
   left and right exhaust pipes passing left and right sides of an engine and extending rearward; and
   a connection pipe connecting the left and right exhaust pipes, wherein
   the connection pipe is disposed in an area enclosed by a left bank angle line connecting a first ground contact point on a portion of the left exhaust pipe of the motorcycle and a ground contact point of a tire when the motorcycle is leaned to the left, a right bank angle line connecting a first ground contact point on a portion of the right exhaust pipe of the motorcycle and the ground contact point of the tire when the motorcycle is leaned to the right, and a bottom surface of the engine, and
   the connection pipe comprises left and right connection sections to the left and right exhaust pipes that contact the left and right bank angle lines.

2. The exhaust system according to claim 1, wherein
   the connection pipe comprises left and right inclined sections inclining downward and inward in a width direction from connections to the left and right exhaust pipes, and
   the left and right inclined sections have an elliptical horizontal cross-section.

3. The exhaust system according to claim 2, wherein a major axis of the elliptical cross-section is directed in a longitudinal direction of the motorcycle.

4. The exhaust system according to claim 2, wherein the left and right inclined sections contact the left and right bank angle lines.

5. The exhaust system according to claim 1, wherein the connection pipe is welded to the left and right exhaust pipes.

6. The exhaust system according to claim 1, wherein the connection pipe includes left and right connection pipes divided generally at a center in a width direction, and detachably connected by a joint member.

7. The exhaust system according to claim 6, wherein a connecting part of the left and right connection pipes has an elliptical horizontal cross-section.

8. The exhaust system according to claim 1, wherein the connection pipe passes a front side of an oil pan formed at a bottom of the engine.

9. The exhaust system according to claim 8, wherein the connection pipe is positioned in a concave groove extending in a width direction formed on a front wall of the oil pan.

10. The exhaust system according to claim 8, wherein a lower surface of the connection pipe is generally at a same height as a lower surface of the oil pan.

11. A motorcycle, comprising:
an engine;
a tire;
left and right exhaust pipes passing left and right sides of the engine and extending rearward; and
a connection pipe connecting the left and right exhaust pipes, wherein
the connection pipe is disposed in an area enclosed by a left bank angle line connecting a first ground contact point on a portion of the left exhaust pipe of the motorcycle and a ground contact point of the tire when the motorcycle is leaned to the left, a right bank angle line connecting a first ground contact point on a portion of the right exhaust pipe of the motorcycle and a ground contact point of the tire when the motorcycle is leaned to the right, and a bottom surface of the engine, and
the connection pipe comprises left and right connection sections to the left and right exhaust pipes that contact the left and right bank angle lines.

\* \* \* \* \*